(12) United States Patent
Matsunaga (10) Patent No.: US 9,976,019 B2
(45) Date of Patent: May 22, 2018

(54) THERMOPLASTIC ELASTOMER COMPOSITION

(71) Applicant: Sumitomo Chemical Company, Limited, Tokyo (JP)

(72) Inventor: Kazuyuki Matsunaga, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days. days.

(21) Appl. No.: 14/666,930

(22) Filed: Mar. 24, 2015

(65) Prior Publication Data

US 2015/0274950 A1     Oct. 1, 2015

(30) Foreign Application Priority Data

Mar. 31, 2014 (JP) ................ 2014-071724

(51) Int. Cl.
| | | |
|---|---|---|
| *C08L 23/00* | (2006.01) | |
| *C08L 23/12* | (2006.01) | |
| *C08L 23/08* | (2006.01) | |
| *C08L 23/10* | (2006.01) | |

(52) U.S. Cl.
CPC ............ *C08L 23/12* (2013.01); *C08L 23/08* (2013.01); *C08L 23/0815* (2013.01); *C08L 23/10* (2013.01); *C08L 2205/025* (2013.01); *C08L 2205/035* (2013.01); *C08L 2207/02* (2013.01); *C08L 2207/04* (2013.01); *C08L 2308/00* (2013.01); *C08L 2312/00* (2013.01)

(58) Field of Classification Search
CPC ...................................... C08L 23/12
See application file for complete search history.

(56) References Cited

U.S. PATENT DOCUMENTS

| | | | | |
|---|---|---|---|---|
| 7,439,296 | B2 * | 10/2008 | Kanzaki ............... | C08F 297/08 524/451 |
| 2001/0024717 | A1 * | 9/2001 | Sugimoto ............. | B29C 41/18 428/318.4 |
| 2006/0160941 | A1 * | 7/2006 | Kanzaki ............... | C08F 297/08 524/451 |
| 2009/0326123 | A1 * | 12/2009 | Nakajima ............ | C08K 3/0033 524/394 |
| 2012/0259057 | A1 | 10/2012 | Ohtani | |

FOREIGN PATENT DOCUMENTS

| | | |
|---|---|---|
| JP | 2011162216 A | 8/2011 |
| JP | 2012107261 A | 6/2012 |
| JP | 2013035888 * | 2/2013 |
| JP | 2013035888 A | 2/2013 |

OTHER PUBLICATIONS

Extended Search Report dated Jun. 9, 2015 in EP Application No. 15161035.9.

* cited by examiner

*Primary Examiner* — Irina Krylova
(74) *Attorney, Agent, or Firm* — Panitch Schwarze Belisario & Nadel LLP (57) ABSTRACT

Provided is a thermoplastic elastomer composition from which an air bag cover having an appearance suitable for painting-free applications can be produced, specifically, a thermoplastic elastomer composition obtained by dynamically heat-treating 25% by weight to 50% by weight of a prescribed heterophasic polymeric material (A), 15% by weight to 40% by weight of a prescribed propylene-ethylene copolymer (B), 15% by weight to 35% by weight of a prescribed ethylene-α-olefin copolymer (C), and 15% by weight to 35% by weight of a prescribed ethylene-α-olefin copolymer (D) in the presence of a crosslinking agent, provided that the combined amount of the above-mentioned (A), (B), (C) and (D) is taken as 100% by weight.

6 Claims, 1 Drawing Sheet

THERMOPLASTIC ELASTOMER COMPOSITION

BACKGROUND OF THE INVENTION

Technical Field

The present invention relates to a thermoplastic elastomer composition.

Background Art

Air bag devices for vehicles are installed in steering wheels, in instrument panels in front of passenger seats, under knees of driver seats and passenger seats, in side pillars, etc. The air bag covers of air bag devices are required to have a stiffness suited for each application, such as for a driver seat and a passenger seat, a high tensile strength or tear strength so as not to allow the air bag covers to rupture at a part other than a tear line (namely, a thin-wall part formed so as to allow an air bag cover to rupture upon expansion of the air bag), and a good low-temperature impact resistance so as to withstand use in cold climates.

As such an air bag cover, there has been proposed an injection molded article made of a polyolefin-based thermoplastic elastomer composition comprising a propylene resin and an ethylene-α-olefin copolymer elastomer. For example, US 2012/0259057 A1 discloses an air bag cover made of an elastomer resin composition comprising a propylene polymeric material produced through multistage polymerization, an ethylene-α-olefin-nonconjugated diene copolymer elastomer, and a mineral oil-based softening agent. JP-A-2013-35888 discloses an air bag cover made of an elastomer resin composition comprising a propylene polymeric material produced through multistage polymerization, an ethylene-α-olefin copolymer, and a propylene-ethylene copolymer.

In recent years, air bag covers installed in visible sites such as steering wheels are under investigation for eliminating painting and are requested to be good in low-temperature impact resistance and good in appearance. Moreover, good mold release is also requested in order to shorten a molding cycle at the time of injection molding. However, the above-mentioned thermoplastic elastomer compositions were not good in the appearance of tear line parts of air bag covers made thereof to such an extent that painting can be eliminated and also not sufficient regarding mold release.

SUMMARY OF THE INVENTION

In view of the above problems, the present invention provides a thermoplastic elastomer composition from which an air bag cover having an appearance suitable for painting-free applications and a good mold release can be produced.

The present invention relates to a thermoplastic elastomer composition obtained by dynamically heat-treating 25% by weight to 50% by weight of a heterophasic polymeric material (A) defined below, 15% by weight to 40% by weight of a propylene-ethylene copolymer (B) defined below, 15% by weight to 35% by weight of an ethylene-α-olefin copolymer (C) having a density of not lower than 0.850 g/cm³ but lower than 0.860 g/cm³ and a melt flow rate, measured at 190° C. under a load of 21.18 N, of 0.7 g/10 min to 10 g/min, and 15% by weight to 35% by weight of an ethylene-α-olefin copolymer (D) having a density of not lower than 0.850 g/cm³ but lower than 0.865 g/cm² and a melt flow rate, measured at 190° C. under a load of 21.18 N, of not less than 0.01 g/10 min but less than 0.7 g/min, in the presence of a crosslinking agent, provided that the combined amount of (A), (B), (C) and (D) is taken as 100% by weight; wherein the heterophasic polymeric material (A) is a polymeric material obtained through multistage polymerization and composed of 70% by weight to 90% by weight of a propylene homopolymer (I) and 10% by weight to 30% by weight of a copolymer (II) obtained by polymerizing at least any one monomer selected from the group consisting of propylene and α-olefins having 4 or more carbon atoms with ethylene, provided that the weight of the entire heterophasic polymeric material (A) is taken as 100% by weight, wherein the content of monomer units derived from ethylene is 22% by weight to 80% by weight, where the weight of the copolymer (II) is taken as 100% by weight, the propylene-ethylene copolymer (B) is a propylene-ethylene copolymer having a content of monomer units derived from propylene of 80% by weight to 98% by weight and a content of monomer units derived from ethylene of 2% by weight to 20% by weight, provided that the weight of the entire propylene-ethylene copolymer (B) is taken as 100% by weight, and the thermoplastic elastomer composition has a melt flow rate, measured at 230° C. under a load of 21.18 N, of 1 g/10 min to 100 g/min.

According to the present invention, there can be provided a thermoplastic elastomer composition from which an air bag cover having appearance suitable for a non-painting application and good mold release can be produced.

DETAILED DESCRIPTION OF THE PREFERRED EMBODIMENTS

[Thermoplastic Elastomer Composition]

The thermoplastic elastomer composition (henceforth also referred to as resin composition) according to the present invention is one obtained by dynamically heat-treating a composition comprising a prescribed heterophasic polymeric material (A), a prescribed propylene-ethylene copolymer (B), a prescribed ethylene-α-olefin copolymer (C), and a prescribed ethylene-α-olefin copolymer (D) in the presence of a crosslinking agent. The components will be described individually below.

<Heterophasic Polymeric Material (A)>

The heterophasic polymeric material (A) (henceforth also referred to as component (A)) is a mixture obtained through multistage polymerization, composed of a propylene homopolymer (I) and copolymer (II) obtained by polymerizing at least any one monomer selected from the group consisting of propylene and α-olefins having 4 or more carbon atoms with ethylene, and having a structure where the copolymer (II) is dispersed in a matrix of the propylene homopolymer (I). As to the contents of the propylene homopolymer (I) and the copolymer (II) in the component (A), in view of the low-temperature impact resistance and the appearance of a molded article to be obtained, the content of the propylene homopolymer (I) is 70% by weight to 90% by weight and the content of the copolymer (II) is 10% by weight to 30% by weight relative to 100% by weight of the weight of the entire component (A). Preferably, the content of the propylene homopolymer (I) is 75% by weight to 90% by weight and the content of the copolymer (II) is 10% by weight to 25% by weight.

Examples of the α-olefin having 4 or more carbon atoms in the copolymer (II) include α-olefins having 4 to 20 carbon atoms, preferably 4 to 10 carbon atoms. Specific examples of such α-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosen, 3-methyl-1-butene, 3-methyl-1-pentene, 4-methyl-1-pentene, 2-ethyl-1-hexene, and 2,2,4-trimethyl-1-pentene. Among these, use of 1-butene, 1-hexene, or 1-octene is preferable. These may be used either individually or in a combination.

In view of the low-temperature impact resistance of a molded article to be obtained, the content of the monomer units derived from ethylene in the copolymer (II) is preferably 22% by weight to 80% by weight, more preferably 25% by weight to 70% by weight, even more preferably 27% by weight to 60% by weight relative to 100% by weight of the copolymer (II). The content of the monomer units derived from ethylene can be determined by infrared spectroscopy.

Specific examples of the copolymer (II) include a propylene-ethylene copolymer, an ethylene-1-butene copolymer, an ethylene-1-hexene copolymer, an ethylene-1-octene copolymer, a propylene-ethylene-1-butene copolymer, a propylene-ethylene-1-hexene copolymer, and a propylene-ethylene-1-octene copolymer; use of a propylene-ethylene copolymer or a propylene-ethylene-1-butene copolymer is preferable. These may be either a random copolymer or a block copolymer.

The melt flow rate of the component (A) measured at 230° C. under a load of 21.18 N in accordance with JIS K7210 is preferably 10 g/10 minutes to 300 g/10 minutes, more preferably 20 g/10 minutes to 100 g/10 minutes in view of the appearance and the tensile elongation at break of a molded article to be obtained.

The intrinsic viscosity [ηcxs](measured at 135° C. in tetralin) of the components soluble in xylene at 20° C. of the component (A) is preferably 1.5 dl/g to 7 dl/g in view of the appearance and the low-temperature impact resistance of a molded article to be obtained. The ratio ([ηcxs]/[ηcxis]) of the [ηcxs] to the intrinsic viscosity [ηcxis](measured at 135° C. in tetralin) of the components insoluble in xylene at 20° C. is preferably from 1.5 to 9. As an intrinsic viscosity, there is used a value obtained by measuring a reduced viscosity in tetralin at 135° C. with an Ubbelohde viscometer and then calculating the value by an extrapolation method in accordance with the calculation method disclosed in "Kobunshi Yoeki (Polymer Solution), Kobunshi Jikkengaku (Polymer Experiment Study) Vol. 11" page 491 (published by Kyoritsu Shuppan Co., Ltd., 1982).

Here, the content of the components soluble in xylene at 20° C. (CXS portion) and the content of the components insoluble in xylene at 20° C. (CXIS portion) can be determined by the method described below. After completely dissolving about 5 g of the component (A) in 500 ml of boiling xylene, the xylene solution is cooled to room temperature slowly, conditioned at 20° C. for 4 hours or more, and then the precipitate and the solution are separated by filtration. The precipitate is obtained as the CXIS portion, and the CXS portion can be obtained by collecting the polymer dissolving in the solution by removing the solvent from the solution.

The component (A) can be produced through multistage polymerization using a polymerization catalyst. Specifically, it is preferable to use a method in which the propylene homopolymer (I) is produced in a former polymerization step and the copolymer (II) is produced by polymerizing at least one monomer selected from the group consisting of propylene and α-olefins having 4 or more carbon atoms with ethylene in a latter polymerization step.

Examples of the polymerization catalyst include Ziegler type catalyst systems, Ziegler-Natta type catalyst systems, catalyst systems composed of an alkyl aluminoxane and a compound of a transition metal of Group 4 of the periodic table which compound has a cyclopentadienyl ring, and catalyst systems composed of an organoaluminum compound, a compound of a transition metal of Group 4 of the periodic table, the compound having a cyclopentadienyl ring, and a compound capable of reacting with the compound of the transition metal to form an ionic complex.

Preliminarily polymerized catalysts prepared by preliminarily polymerizing ethylene or an α-olefin in the presence of the aforementioned catalyst systems may also be used. Examples of these catalyst systems include the catalyst systems disclosed in JP-A-61-218606, JP-A-61-287904, JP-A-5-194685, JP-A-7-216017, JP-A-9-316147, JP-A-10-212319, and JP-A-2004-182981.

Examples of the polymerization method include bulk polymerization, solution polymerization, slurry polymerization, or vapor phase polymerization. The bulk polymerization is a method in which polymerization is performed using an olefin that is in a liquid state at the polymerization temperature, the solution polymerization or the slurry polymerization is a method in which polymerization is performed in an inert hydrocarbon solvent, such as propane, butane, isobutane, pentane, hexane, heptane, and octane, and the vapor phase polymerization is a method in which a monomer in a gaseous state is used as a medium and a monomer in a gaseous state is polymerized in the medium. Such polymerization methods may be in a batch system or in a continuous system and may be arbitrarily combined. From the industrial and economical point of view, a production method by a continuous vapor phase polymerization method or by a bulk-vapor phase polymerization method in which a bulk polymerization method and a vapor phase polymerization method are used continuously is preferred.

The conditions in the polymerization step (e.g., polymerization temperature, polymerization pressure, monomer concentration, input amount of catalyst, and polymerization time) may be determined appropriately.

In the component (A), the isotactic pentad fraction of the propylene homopolymer (I) measured by $^{13}$C-NMR is preferably 0.95 or more, more preferably 0.98 or more.

The isotactic pentad fraction is the fraction of the propylene monomer units located at the centers of the isotactic sequences in the pentad units within a propylene polymer molecule chain, in other words, the fraction of the propylene monomer units located within the sequences (henceforth represented by mmmm) in which five propylene monomer units are continuously meso-bonded. The method for measuring the isotactic pentad fraction is the method disclosed by A. Zambelli, et al. in Macromolecules 6, 925 (1973), i.e., a method measured with $^{13}$C-NMR.

Specifically, the ratio of the area of an NMR peak assigned to mmmm to the area of an absorption peak within the methyl carbon region, both measured using a $^{13}$C-NMR spectrum is the isotactic pentad fraction.

The melting temperature of the component (A) is preferably 155° C. or higher, more preferably 160° C. or higher in view of the mold release of a molded article at the time of injection molding. The melting temperature is usually 175° C. or lower. The melting temperature is a peak temperature of an endothermic peak at which the peak temperature is highest in a differential scanning calorimetry curve measured with a differential scanning calorimeter during a temperature raising operation. The measurement of a differential scanning calorimetry curve is carried out with a differential scanning calorimeter under the following conditions, and the melting temperature is determined from the differential scanning calorimetry curve produced during the temperature raising operation.

<Measurement Conditions>

Temperature falling operation: after melting the component (A) at 220° C., the temperature is fallen from 220° C. to −90° C. at a temperature ramp-down rate of 5° C./min.

Temperature raising operation: Immediately after the temperature falling operation, the temperature is raised from −90° C. to 200° C. at a temperature ramp-up rate of 5° C./min.

The amount of the component (A) to be subjected to the heat treatment is 25% by weight to 50% by weight in view of the flowability of the resin composition and the strength of a molded article to be obtained (the combined amount of the component (A), the component (B), the component (C), and the component (D) is taken as 100% by weight). The amount of the component (A) is preferably 27% by weight to 45% by weight, and more preferably 30% by weight to 40% by weight.

<Propylene-Ethylene Copolymer (B)>

The propylene-ethylene copolymer (B) (henceforth also referred to as component (B)) has a content of monomer units derived from propylene of 80% by weight to 98% by weight and a content of monomers unit derived from ethylene of 2% by weight to 20% by weight (the combined amount of the monomer units derived from propylene and the monomer units derived from ethylene is taken as 100% by weight). Preferably, the content of the monomer units derived from propylene is 90% by weight to 98% by weight and the content of the monomer units derived from ethylene is 2% by weight to 10% by weight. If the content of the monomer units derived from propylene is excessively small, the appearance of a molded article to be obtained becomes insufficient.

The content of the monomer units derived from ethylene and the content of the monomer units derived from propylene can be determined by infrared spectroscopy.

In view of the appearance and the tensile elongation at break of a molded article to be obtained, the melt flow rate of the component (B) measured at 230° C. under a load of 21.18 N in accordance with JIS K7210 is 1 g/10 minutes to 100 g/10 minutes, preferably 10 g/10 minutes to 100 g/10 minutes.

The component (B) has monomer units based on propylene and additionally units based on other monomers. Examples of such other monomers include ethylene and α-olefins having 4 to 20 carbon atoms. Examples of the α-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, a 1-octadecene, 1-nonadecene, 1-eicosen, 3-methyl-1-butene, 3-methyl-1-pentene, 4-methyl-1-pentene, 2-ethyl-1-hexene, and 2,2,4-trimethyl-1-pentene. Preferred are ethylene and α-olefins having 4 to 10 carbon atoms, and more preferred are ethylene, 1-butene, 1-hexene, and 1-octene. These may be used either individually or in combination.

The component (B) is obtained by performing polymerization using a polymerization catalyst. Examples of the polymerization catalyst include catalysts such as those to be used for the production of the component (A). Examples of the polymerization method include a slurry polymerization method, a solution polymerization method, a bulk polymerization method, and a vapor phase polymerization method, and these may be used in combination. Commercially available products may also be used.

The amount of the component (B) to be subjected to the heat treatment is 15% by weight to 40% by weight in view of the low-temperature impact resistance of a molded article to be obtained (the combined amount of the component (A), the component (B), the component (C), and the component (D) is taken as 100% by weight). The amount of the component (B) is preferably 15% by weight to 35% by weight, and more preferably 16% by weight to 30% by weight.

<Ethylene-α-Olefin Copolymer (C)>

The ethylene-α-olefin copolymer (C) (henceforth also referred to as component (C)) is a copolymer having a density of not lower than 0.850 g/cm$^3$ but lower than 0.860 g/cm$^3$ and a melt flow rate measured at 190° C. under a load of 21.18 N of 0.7 g/10 minutes to 10 g/10 minutes.

Preferably, the density is 0.855 g/cm$^3$ to 0.858 g/cm$^3$. The low-temperature impact resistance tends to deteriorate when the density is excessively high.

In view of the mold release of a molded article to be obtained, the melt flow rate is preferably 5.0 g/10 min or less, more preferably 3.0 g/10 minutes or less, and even more preferably 2.0 g/10 min or less. In view of the flowability of the resin composition, the melt flow rate is preferably 0.80 g/10 minutes or more, and more preferably 0.90 g/10 minutes or more. The melt flow rate is a value measured in accordance with JIS K7210.

Examples of the α-olefin to be used for the component (C) include α-olefins having 4 to 8 carbon atoms. Specific examples include 1-butene, 2-methylpropylene, 1-pentene, 3-methyl-1-butene, 1-hexene, 4-methyl-1-pentene, and 1-octene. Preferred are α-olefins having a carbon-carbon double bond on a terminal carbon atom and having 4 to 8 carbon atoms, such as 1-butene, 1-hexene, and 1-octene. As to the α-olefin of the component (C), only one type thereof may be copolymerized with ethylene or alternatively two or more types thereof may be copolymerized with ethylene.

In view of the low-temperature impact resistance of a molded article to be obtained, the content of the monomer units derived from ethylene of the component (C) is preferably 50% by weight to 80% by weight, more preferably 55% by weight to 75% by weight relative to 100% by weight of the weight of the entire component (C).

The content of the monomer units derived from ethylene can be determined by infrared spectroscopy.

Specific examples of the component (C) include an ethylene-1-butene copolymer elastomer, an ethylene-1-hexene copolymer elastomer, an ethylene-1-octene copolymer elastomer, an ethylene-propylene-1-butene copolymer elastomer, an ethylene-propylene-1-hexene copolymer elastomer, and an ethylene-propylene-1-octene copolymer elastomer. Especially, use of an ethylene-1-octene copolymer elastomer is preferred.

The component (C) can be produced using a catalyst for olefin polymerization. For example, Ziegler-Natta type catalysts and complex type catalysts such as metallocene complexes and non-metallocene complexes can be used as the catalyst for olefin polymerization. Examples of the polymerization method include a slurry polymerization method, a solution polymerization method, a bulk polymerization method, and a vapor phase polymerization method. Commercially available products may also be used.

Examples of the commercially available products include the Engage (registered trademark) series produced by The Dow Chemical Company.

The amount of the component (C) to be subjected to the heat treatment is 15% by weight to 35% by weight in view of the flowability of the resin composition and the low-temperature impact resistance of a molded article to be obtained (the combined amount of the component (A), the component (B), the component (C), and the component (D) is taken as 100% by weight). The amount of the component (C) is preferably 15% by weight to 33% by weight, and more preferably 18% by weight to 30% by weight.

<Ethylene-α-Olefin Copolymer (D)>

The ethylene-α-olefin copolymer (D) (henceforth also referred to as component (D)) is a copolymer having a density of not lower than 0.850 g/cm$^3$ but lower than 0.865 g/cm$^3$ and a melt flow rate measured at 190° C. under a load of 21.18 N of not lower than 0.01 g/10 minutes but lower than 0.7 g/10 minutes.

The density is preferably 0.855 g/cm$^3$ to 0.862 g/cm$^3$, and more preferably 0.857 g/cm$^3$ to 0.861 g/cm$^3$. The low-temperature impact resistance tends to deteriorate when the density is excessively high.

In view of the mold release and the flowability of a molded article to be obtained, the melt flow rate is preferably 0.03 g/10 minutes to 0.6 g/10 minutes, more preferably 0.05 g/10 minutes to 0.5 g/10 minutes. The melt flow rate is a value measured at a temperature of 230° C. and a load of 21.18 N in accordance with JIS K7210.

Examples of the α-olefins to be used for the component (D) include α-olefins the same as those for the component (C).

In view of the low-temperature impact resistance of a molded article to be obtained, the content of the monomer units derived from ethylene of the component (D) is 40% by weight to 80% by weight, preferably 50% by weight to 70% by weight relative to 100% by weight of the weight of the entire component (D).

The content of the monomer units derived from ethylene can be determined by infrared spectroscopy.

Specific examples of the component (D) include an ethylene-1-butene copolymer elastomer, an ethylene-1-hexene copolymerelastomer, an ethylene-1-octene copolymer elastomer, an ethylene-propylene-1-butene copolymer elastomer, an ethylene-propylene-1-hexene copolymer elastomer, and an ethylene-propylene-1-octene copolymer elastomer. Especially, use of an ethylene-1-butene copolymer elastomer is preferred.

The component (D) can be produced using a catalyst for polymerization. For example, Ziegler-Natta type catalysts and complex type catalysts such as metallocene complexes and non-metallocene complexes can be used as the catalyst for olefin polymerization. Examples of the polymerization method include a slurry polymerization method, a solution polymerization method, a bulk polymerization method, and a vapor phase polymerization method. Commercially available products may also be used.

Examples of the commercially available products include the Engage (registered trademark) series produced by The Dow Chemical Company and Tafmer (registered trademark) series produced by Mitsui Chemicals, Inc.

The amount of the component (D) to be subjected to the heat treatment is 15% by weight to 35% by weight in view of the mold release of a molded article to be obtained (the combined amount of the component (A), the component (B), the component (C), and the component (D) is taken as 100% by weight). The amount of the component (D) is preferably 15% by weight to 33% by weight, and more preferably 20% by weight to 30% by weight.

In view of the flowability of the resin composition and the low-temperature impact resistance of a molded article to be obtained, the sum total of the amounts of the component (C) and the component (D) to be subjected to the heat treatment is preferably 33% by weight to 55% by weight, and more preferably 40% by weight to 50% by weight.

<Crosslinking Agent>

Preferably, it is preferred to use an organic peroxide as the crosslinking agent to be used for the present invention. Examples of such an organic peroxide include ketone peroxides, diacyl peroxides, hydroperoxides, dialkyl peroxides, peroxyketals, peroxydicarbonates, and peroxyesters.

Examples of the ketone peroxides include cyclohexane peroxide and methylcyclohexanone peroxide.

Examples of the diacyl peroxides include isobutyryl peroxide and benzoyl peroxide.

Examples of the hydroperoxides include 2,2,4-trimethylpentyl-2-hydroperoxide, diisopropylbenzohydroperoxide, and cumene hydroperoxide.

Examples of the dialkyl peroxides include dicumyl peroxide, 2,5-dimethyl-2,5-di-(tert-butylperoxy)hexane, 2,5-dimethyl-2,5-di-(tert-butylperoxy)hexyne-3, tert-butyl cumyl peroxide, and di-tert-butyl peroxide.

Examples of the peroxyketals include 1,1-bis(tert-butyl peroxide)cyclohexane and n-butyl-4,4-bis(tert-butylperoxy) valerate.

Examples of the peroxydicarbonates include di-n-propyl peroxydicarbonate and di-2-ethoxyethyl peroxydicarbonate.

Examples of the peroxyesters include cumyl peroxyneodecanoate, tert-butyl peroxypivalate, and tert-hexyl peroxybenzoate.

These may be used either individually or in combination.

In view of the appearance of a molded article to be obtained, the amount of the crosslinking agent to be subjected to the heat treatment is 0.01 parts by weight to 1.0 part by weight, preferably 0.05 parts by weight to 0.50 parts by weight, relative to 100 parts by weight of the combined amount of the component (A), the component (B), the component (C), and the component (D). The amount of the crosslinking agent is more preferably 0.08 to 0.25 parts by weight. If the loading of the crosslinking agent is excessively small, the flowability of the resin composition or the appearance of a molded article to be obtained may be insufficient, whereas if excessively large, the low-temperature impact resistance or the material strength of a molded article to be obtained may deteriorate.

A crosslinking aid may be added in combination with the crosslinking agent. Examples of the crosslinking aid include peroxide crosslinking aids, such as N,N'-m-phenylenebismaleimide, toluylene bismaleimide, p-quinonedioxime, nitrosobenzene, diphenylguanidine, and trimethylolpropane; or polyfunctional vinyl monomers, such as divinylbenzene, ethylene glycol dimethacrylate, polyethylene glycol dimethacrylate, trimethylolpropane trimethacrylate, and allyl methacrylate.

The resin composition can be obtained by performing melt-kneading of the component (A), the component (B), the component (C), and the component (D), then adding a crosslinking agent, and dynamically performing heat treatment. As to the addition of the crosslinking agent, it is permitted to melt-kneading the component (A), the component (B), the component (C), and the component (D) beforehand, followed by cooling and subsequent additional melt-kneading, and then add the crosslinking agent, or alternatively it is permitted to add the crosslinking agent during the melt-kneading of the component (A), the component (B), the component (C), and the component (D). For example, it is permitted to feed the component (A), the component (B), the component (C), and the component (D) at the upstream of an extruder and feed the crosslinking agent downstream from the position where those components were fed. At this time, the crosslinking aid may be fed either at the upstream of the extruder or at the same position where the crosslinking agent is fed.

Although the temperature of the heat treatment varies depending upon the type of the crosslinking agent to be added, it is preferred be a temperature at which the respective components after the melt-kneading can be crosslinked sufficiently, and it is usually about 200° C.

From the viewpoint of imparting mold release for improving the production stability in injection molding, the resin composition may further contain the following component (E).

Component (E): at least one compound selected from the compound group consisting of fatty acids having 5 or more carbon atoms, metal salts of fatty acids having 5 or more carbon atoms, amides of fatty acids having 5 or more carbon atoms, and esters of fatty acids having 5 or more carbon atoms.

Examples of the fatty acids having 5 or more carbon atoms of the component (E) include lauryl acid, palmitic acid, stearic acid, behenic acid, oleic acid, erucic acid, linoleic oil, and ricinoleic acid.

Examples of the metal salts of fatty acids having 5 or more carbon atoms of the component (E) include salts of the aforementioned fatty acids with metals, such as Li, Na, Mg, Al, K, Ca, Zn, Ba, and Pb; specific examples include lithium stearate, sodium stearate, calcium stearate, and zinc stearate.

Examples of the amides of fatty acids having 5 or more carbon atoms of the component (E) include lauramide, palmitamide, stearamide, oleamide, erucamide, methylenebisstearamide, ethylenebisstearamide, ethylenebisoleamide, and stearyldiethanolamide. Especially, erucamide is preferred.

Examples of the esters of fatty acids having 5 or more carbon atoms of the component (E) include esters of the alcohol given below with the above-mentioned fatty acids.

Aliphatic alcohols, such as myristyl alcohol, palmityl alcohol, stearyl alcohol, behenyl alcohol, and 12-hydroxystearyl alcohol; aromatic alcohols, such as benzyl alcohol, β-phenylethyl alcohol, and phthalyl alcohol; polyhydric alcohols, such as glycerol, diglycerol, polyglycerol, sorbitan, sorbitol, propylene glycol, polypropylene glycol, polyethylene glycol, pentaerythritol, and trimethylolpropane.

Specific examples include glycerol monooleate, glycerol dioleate, polyethylene glycol monostearate, and citryl distearate.

In view of the balance between the mold release after injection molding and the appearance of the surface of a molded article, the amount of the component (E) to be subjected to the heat treatment is preferably 0.01 parts by weight to 1.5 parts by weight, more preferably 0.05 parts by weight to 1.0 part by weight per 100 parts by weight in total of the component (A), the component (B), the component (C), and the component (D).

The resin composition may, as necessary, contain an inorganic filler, such as a talc, calcium carbonate, and calcined kaolin, an organic filler, such as fiber, wood flour, and cellulose powder, a lubricant, such as silicone oil and silicone gum, an antioxidant, a weathering stabilizer, a UV absorber, a heat stabilizer, a light stabilizer, a pigment, a nucleating agent, an adsorbent, etc.

[Physical Properties and Applications of Thermoplastic Elastomer Composition]

The resin composition according to the present invention can be produced by dynamically heat treating a composition comprising specified amounts of the component (A), the component (B), the component (C), and the component (D) in the presence of a crosslinking agent, and a molded article excellent in appearance, low-temperature impact resistance, and strength can be produced from the resin composition.

Preferably, the resin composition further fulfills the following physical properties.

The melt flow rate of the resin composition measured at a temperature of 230° C. under a load of 21.18 N in accordance with JIS K7210 is usually 0.1 g/10 minutes to 100 g/10 minutes, and in view of the flowability of the resin composition and the prevention of sink marks or burrs from occurring during the production of a molded article, the melt flow rate is preferably 1 g/10 minutes to 50 g/10 minutes, and more preferably 5 g/10 minutes to 30 g/10 minutes.

In view of the low-temperature impact resistance of a molded article to be obtained, the result of an IZOD impact test measured for the resin composition in accordance with JIS K7110 is preferably "nondestructive at a test temperature of −40° C." and more preferably "nondestructive also at a test temperature of −43° C.".

In view of the strength of a molded article to be obtained, the tear strength of the resin composition in a tear test measured in accordance with JIS K6252 is preferably 80 N/mm or more, and more preferably 82 N/mm or more.

In view of the appearance and the mold release of a molded article to be obtained, the crystallization time of the resin composition is preferably 85 seconds or more, more preferably 87 seconds or more. In the present invention, there is used as the crystallization time a value calculated from the relationship between the time and the calorific value due to crystallization measured with a differential scanning calorimeter.

The resin composition according to the present invention is processed by a known molding method, preferably by an injection molding method, into molded articles, such as automobile interior parts, such as air bag covers, instrument panels, and pillars, automobile exterior parts, such as mouls, household appliance components, construction materials, furniture, sundry items, etc. The molding temperature at the time of injection molding is commonly 150° C. to 300° C., preferably 180° C. to 280° C., and more preferably 200° C. to 250° C. The temperature of a mold is usually 0° C. to 100° C., preferably 20° C. to 90° C., more preferably 40° C. to 80° C., and even more preferably 50° C. to 75° C.

EXAMPLES

The present invention is described in more detail below with reference to examples and comparative examples.

[Measurement of Physical Properties]

(1) Melt Flow Rate (MFR)

The melt flow rate was measured at 230° C. under a load of 21.18 N in accordance with JIS K7210.

(2) Intrinsic Viscosity ([ηcxs], [ηcxis], Unit: dl/g)

The intrinsic viscosities were measured with an Ubbelohde viscometer at 135° C. using tetralin as a solvent.

(3) Contents of Ethylene Units and Propylene Units

The contents were determined by a method using an infrared absorption spectrometer (FT-IR5200, manufactured by Jasco).

(4) Melting Temperature (Unit: ° C.)

A differential scanning calorie curve was measured under the following measurement conditions by use of a heat flow rate differential scanning calorimeter (DSC Q100 manufactured by TA Instruments Co., Ltd), and a melting temperature was determined from the differential scanning calorie curve in a temperature raising operation.

<Measurement Conditions>

Temperature falling operation: After melting a sample at 220° C., the temperature was fallen from 220° C. to −90° C. at a temperature ramp-down rate of 5° C./min.

Temperature raising operation: Immediately after the temperature falling operation, the temperature was raised from −90° C. to 200° C. at a temperature ramp-up rate of 5° C./min.

(5) Crystallization Time (Second)

Using a heat flow rate differential scanning calorimeter (Diamond DSC manufactured by PerkinElmer) under a nitrogen atmosphere, a sample was held at 220° C. for 5 minutes, then cooled to 130° C. and held at this temperature. The relationship between the calorific value due to the crystallization of the sample and the time in this course is measured, and the time taken to reach a calorific value one-half the entire calorific value is taken as a crystallization time (second).

As samples measured, there were used press sheets prepared by pressing the thermoplastic elastomer compositions of Example 1, Comparative Example 2 and Comparative Examples 9 to 11, described infra, at 230° C. for 5 minutes.

(7) Method for Producing Injection Molded Article for Physical Property Evaluation Using an injection molding machine EC160NII manufactured by Toshiba Machine Co., Ltd. and a side gate flat mold, the thermoplastic elastomer compositions of the examples and the comparative examples were processed into injection molded articles 90 mm in length, 150 mm in width, and 2 mm in thickness under the conditions of a cylinder temperature of 220° C. and a mold temperature of 50° C.

(8) Tensile Strength at Break (TB), Tensile Elongation at Break (EB)

The tensile strength at break and the tensile elongation at break of the injection molded article produced in (7) were measured in accordance with JIS K6251. A JIS No. 3 dumbbell was used and the tensile speed was adjusted to 200 mm/min.

(9) Tear Strength (TS)

The tear strength of the injection molded article produced in (7) was measured in accordance with JIS K6252.

An unnotched angle-shaped specimen was used and the tensile speed was adjusted to 500 mm/min.

(10) Low-Temperature Impact Resistance (IZOD)

The impact resistance of an injection molded article produced in (7) was measured in accordance with JIS K7110. The measurement temperatures are −40° C. and −43° C.

NB=Not broken.

B=Broken.

(11) Molded Appearance

[Injection Molded Article for Appearance Evaluation]

Figure 1:
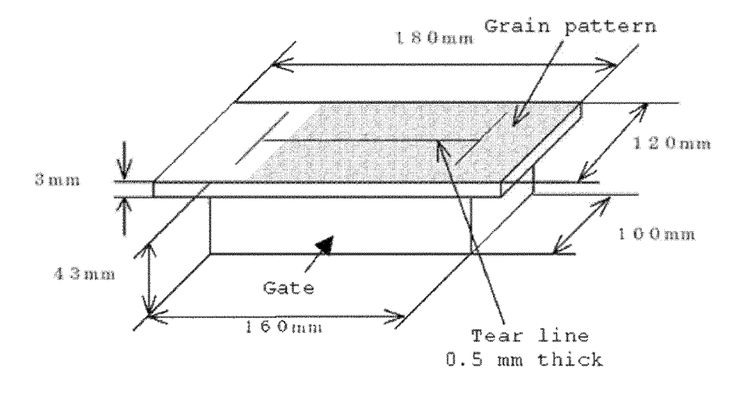
FIG. 1 is a diagram depicting a molded article used for the appearance evaluation in an example.

The thermoplastic elastomer compositions of the examples and the comparative examples were molded into 0.5 mm thick box-shaped molded articles each having a tear line portion under the condition represented by a cylinder temperature of 230° C. and a mold temperature of 70° C. with an injection molding machine (manufactured by Toshiba Machine Co., Ltd.; trade name: EC160NII100-EN) (see FIG. 1).

The uneven brightness of a tear line part surface of each resulting molded article was visually observed and was judged on the following criterion.

○: Uneven brightness is not noticed or there is almost no uneven brightness.

X: Clear uneven brightness is observed.

(12) Mold Release

[Injection Molded Article for Appearance Evaluation]

The thermoplastic elastomer compositions of the examples and the comparative examples were molded into 0.5 mm thick box-shaped molded articles each having a tear line portion under the condition represented by a cylinder temperature of 220° C. and a mold temperature of 50° C. with an injection molding machine (manufactured by Toshiba Machine Co., Ltd.; trade name: EC160NII100-EN) (see FIG. 1). The ease of release from a mold in releasing a tear line part of a molded article obtained and the deformation of a thin part of a molded article surface were evaluated.

○: It was very easy to release the tear line part and almost no deformation was observed.

X: It was difficult to release the tear line part and clear deformation was observed.

[Raw Materials]

(1) Heterophasic Polymeric Material (A)

As the heterophasic polymeric material that is the component (A), there was used a polymeric material (NOBLEN AZ564 produced by Sumitomo Chemical Co., Ltd.) composed of a propylene homopolymer (I) and an ethylene-propylene copolymer (II).

(MFR=28.5 g/10 minutes; melting temperature=164.6° C.; [ηcxs]=2.4 dl/g; [ηcxs]/[ηcxis]=2.1; content of propylene homopolymer (I)=87% by weight; content of copolymer (II)=13% by weight; content of monomer units derived from ethylene of copolymer (II)=46% by weight; content of monomer units derived from propylene of copolymer (II) =52% by weight)

(2) Propylene-Ethylene Copolymer (B)

As the propylene-ethylene copolymer that is the component (B), there was used NOBLEN Z144CE4 produced by Sumitomo Chemical Co., Ltd.

(MFR=27 g/10 minutes; melting temperature=141° C.; content of monomers derived from propylene=96% by weight; content of monomers derived from ethylene=4% by weight)

(3) Ethylene-α-Olefin Copolymer (C)

The following were used as the ethylene-α-olefin copolymer that is the component (C).

(C-1) Ethylene-1-Butene Copolymer

Engage 8842 produced by The Dow Chemical Company (MFR=0.2 g/10 minutes; density=0.857 g/cm$^3$)

(C-2) Ethylene-1-Octene Copolymer

Engage 8100 produced by The Dow Chemical Company (MFR=1.0 g/10 minutes; density=0.870 g/cm$^3$)

(C-3) Ethylene-1-Butene Copolymer

Tafmer 1050S produced by Mitsui Chemicals, Inc. (MFR=1.0 g/10 minutes; density=0.862 g/cm$^3$)

(4) Ethylene-α-Olefin Copolymer (D)

(D-1) Ethylene-1-Octene Copolymer

Engage 7487 produced by The Dow Chemical Company (MFR=1.0 g/10 minutes; density=0.860 g/cm$^3$)

(D-2) Ethylene-1-Octene Copolymer

Engage 8180 produced by The Dow Chemical Company (MFR=0.5 g/10 minutes; density=0.863 g/cm$^3$)

(D-3) Ethylene-1-Butene Copolymer

Engage 7387 produced by The Dow Chemical Company (MFR=0.2 g/10 minutes; density=0.870 g/cm$^3$)

(D-4) Ethylene-1-Octene Copolymer

Engage 8200 produced by The Dow Chemical Company (MFR=5.0 g/10 minutes; density=0.870 g/cm$^3$)

(5) Crosslinking Agent

As a crosslinking agent, there was used 2,5-dimethyl-2,5-di(tert-butyl peroxy)hexene (organic peroxide) diluted to a concentration of 10% with a paraffinic oil.

(6) Other Components

Component (E): Erucamide (NEUTRON S produced by Nippon Fine Chemical Co., Ltd.)

Antioxidant 1: SUMILIZER GA80 produced by Sumitomo Chemical Co., Ltd.

Antioxidant 2: IRGAFOS 168 produced by BASF Japan

Light stabilizer 1: SUMISORB 300 produced by Sumitomo Chemical Co., Ltd.

Light stabilizer 2: TINUVIN 622SF produced by BASF Japan

Light stabilizer 3: TINUVIN 123 produced by BASF Japan

Antiseptic: Hydrotalcite (DHT-4A produced by Kyowa Chemical Industry Co., Ltd.)

Inorganic filler: Calcium carbonate (Vigot 10 produced by Shiraishi Calcium Kaisha, Ltd.)

Crosslinking aid: Trimethylolpropane trimethacrylate (Hi-Cross MS50 produced by Seiko Chemical Co., Ltd.)

Example 1

There were used 35% by weight of the component (A), 20% by weight of the component (B), 20% by weight of (C-1) as the component (C), and 25% by weight of (D-1) as the component (D) (the sum total of the component (A), the component (B), the component (C), and the component (D) is 100% by weight).

To 100 parts by weight in total of the component (A), the component (B), the component (C), and the component (D), 0.05 parts by weight of the component (E), 0.2 parts by weight of antioxidant 1, 0.1 parts by weight of antioxidant 2, 0.2 parts by weight of light stabilizer 1, 0.1 parts by weight of light stabilizer 2, 0.1 parts by weight of light stabilizer 3, 0.2 parts by weight of the antiseptic, 0.6 parts by weight of the inorganic filler, and 0.5 parts by weight of the crosslinking aid were added, followed by melt-kneading with a twin-screw extruder at a cylinder temperature of 200° C. Thereafter, the crosslinking agent in an amount of 2 parts by weight (corresponding to 0.2 parts by weight of the organic peroxide added) was added, followed by melt-kneading, so that a resin composition was obtained. The physical property measurements of the resulting resin composition are shown in Table 1.

Examples 2 to 4 and Comparative Examples 1 to 8

Thermoplastic elastomers were produced in the same manner as in Example 1 except using the materials shown in Tables 1 and 2. The evaluation results of the resulting molded articles are shown in Tables 1 and 2.

TABLE 1

|  |  | Example 1 | Example 2 | Example 3 | Example 4 | Comparative Example 1 | Comparative Example 2 |
|---|---|---|---|---|---|---|---|
| (A) | | 35 | 35 | 35 | 35 | 35 | 55 |
| (B) | | 20 | 20 | 20 | 20 | 20 | — |
| (C-1) | | 20 | 20 | 30 | 15 | 20 | 20 |
| (C-2) | | — | — | — | — | — | — |
| (C-3) | | — | — | — | — | — | — |
| (D-1) | | 25 | — | 15 | 30 | 25 | 25 |
| (D-2) | | — | 25 | — | — | — | — |
| (D-3) | | — | — | — | — | — | — |
| (D-4) | | — | — | — | — | — | — |
| Presence or absence of crosslinking agent | | Present | Present | Present | Present | Absent | Present |
| Crystallization time | Second(s) | 90 | — | — | — | — | 50 |
| MFR | g/10 min | 6 | 7 | 7 | 6 | 8 | 5 |
| Tensile test | TB (Mpa) | 24 | 27 | 24 | 23 | 19 | 22 |
|  | EB (%) | 650 | 550 | 630 | 630 | 470 | 640 |
| Tear test | TS (N/mm) | 83 | 89 | 84 | 83 | 103 | 80 |
| IZOD | −43° C. (Breakage state) | NB | NB-B | NB | NB | NB | NB |
|  | −40° C. (Breakage state) | NB | NB | NB | NB | NB | NB |
| Molding appearance | | ○ | ○ | ○ | ○ | X | X |
| Mold release | | ○ | ○ | ○ | ○ | X | ○ |

TABLE 2

|  | Comparative Example 3 | Comparative Example 4 | Comparative Example 5 | Comparative Example 6 | Comparative Example 7 | Comparative Example 8 |
|---|---|---|---|---|---|---|
| (A) | 55 | 20 | 35 | 35 | 35 | 35 |
| (B) | 20 | 20 | 20 | 20 | 20 | 20 |
| (C-1) | 10 | 25 | — | — | 20 | 20 |
| (C-2) | — | — | 20 | — | — | — |
| (C-3) | — | — | — | 20 | — | — |

TABLE 2-continued

|  |  | Comparative Example 3 | Comparative Example 4 | Comparative Example 5 | Comparative Example 6 | Comparative Example 7 | Comparative Example 8 |
|---|---|---|---|---|---|---|---|
|  | (D-1) | 15 | 35 | 25 | 25 | — | — |
|  | (D-2) | — | — | — | — | — | — |
|  | (D-3) | — | — | — | — | 25 | — |
|  | (D-4) | — | — | — | — | — | 25 |
| Presence or absence of crosslinking agent |  | Present | Present | Present | Present | Present | Present |
| MFR | g/10 min | 33 | 1 | 6 | 6 | 6 | 8 |
| Tensile test | TB (Mpa) | 17 | 16 | 26 | 19 | 27 | 25 |
|  | EB (%) | 530 | 540 | 630 | 670 | 600 | 630 |
| Tear test | TS (N/mm) | 106 | 74 | 86 | 79 | 87 | 89 |
| IZOD | −43° C. (Breakage state) | B | NB | B | NB | B | B |
|  | −40° C. (Breakage state) | B | NB | NB | NB | NB | NB |
| Molding appearance |  | ○ | X | ○ | ○ | ○ | X |
| Mold release |  | ○ | X | ○ | ○ | ○ | X |

Comparative Examples 9 to 11

Thermoplastic elastomers were produced in the same manner as in Example 1 except using the materials shown in Table 3. The evaluation results of the resulting molded articles are shown in Table 3.

TABLE 3

|  |  |  | Comparative Example 9 | Comparative Example 10 | Comparative Example 11 |
|---|---|---|---|---|---|
| (A) | AZ564 |  | 55 | 45 | 25 |
| (B) | Z144CE4 |  | 0 | 10 | 30 |
| (C-1) | ENGAGE 8842 |  | 45 | 45 | 45 |
| (D-1) | ENGAGE 7487 |  | — | — | — |
| Crosslinking agent | Present/Absent |  | Present | Present | Present |
| Crystallization time | 130° C. | Sec | 64 | 82 | 140 |
| MFR | 230° C., 21.2N | g/10 min | 7 | 8 | 10 |
| Tensile test | TB | MPa | 22 | 24 | 25 |
|  | EB | % | 740 | 700 | 740 |
| Tear test | TS | N/mm | 80 | 82 | 84 |
| IZOD | −40° C. | Breakage state | NB | NB | NB |
| Molding appearance |  |  | ○, X | X | X |
| Mold release |  |  | ○, X | X | X |

What is claimed is:

1. A method for producing a thermoplastic elastomer composition, comprising:
dynamically heat-treating 25% by weight to 40% by weight of a heterophasic polymeric material (A) defined below, 15% by weight to 30% by weight of a propylene-ethylene copolymer (B) defined below, 15% by weight to 35% by weight of an ethylene-α-olefin copolymer (C) having a density of not lower than 0.850 g/cm$^3$ but lower than 0.860 g/cm$^3$ and a melt flow rate, measured at 190° C. under a load of 21.18 N, of 0.9 g/10 min to 5 g/10 min, and 15% by weight to 35% by weight of an ethylene-α-olefin copolymer (D) having a density of not lower than 0.850 g/cm$^3$ but lower than 0.865 g/cm$^3$ and a melt flow rate, measured at 190° C. under a load of 21.18 N, of not less than 0.01 g/10 min but less than 0.6 g/10 min, in the presence of a crosslinking agent (E), wherein the total amount of the ethylene-α-olefin copolymer (C) and the ethylene-α-olefin copolymer (D) is 33% by weight to 55% by weight, provided that the combined amount of (A), (B), (C) and (D) is taken as 100% by weight; wherein
the heterophasic polymeric material (A) is a polymeric material obtained through multistage polymerization and composed of 70% by weight to 90% by weight of a propylene homopolymer (I) and 10% by weight to 30% by weight of a copolymer (II) obtained by polymerizing at least any one monomer selected from the group consisting of propylene and α-olefins having 4 or more carbon atoms with ethylene, provided that the weight of the entire heterophasic polymeric material (A) is taken as 100% by weight, wherein the content of monomer units derived from ethylene is 22% by weight to 60% by weight, where the weight of the copolymer (II) is taken as 100% by weight,
the propylene-ethylene copolymer (B) is a propylene-ethylene copolymer having a content of monomer units derived from propylene of 80% by weight to 98% by weight and a content of monomer units derived from ethylene of 2% by weight to 20% by weight, provided that the weight of the entire propylene-ethylene copolymer (B) is taken as 100% by weight,
the thermoplastic elastomer composition has a melt flow rate, measured at 230° C. under a load of 21.18 N, of 1 g/10 min to 100 g/10 min, and
the crosslinking agent (E) is used in an amount of 0.01 parts by weight to 1.0 part by weight relative to 100 parts by weight of the combined amount of (A), (B), (C) and (D).

2. The method according to claim 1, wherein the propylene-ethylene copolymer (B) is a random copolymer.

3. The method according to claim 1, wherein the crystallization time of the thermoplastic elastomer composition is 85 seconds or more.

4. The method according to claim 1, wherein the number of the carbon atoms in the α-olefin constituting the ethylene-α-olefin copolymer in the ethylene-α-olefin copolymer (C) is 6 to 12.

5. The method according to claim 1, wherein the number of the carbon atoms in the α-olefin constituting the ethylene-α-olefin copolymer in the ethylene-α-olefin copolymer (D) is 4.

6. The method according to claim 1, wherein the amount of the heterophasic polymeric material (A) is 25% by weight to 35% by weight.

* * * * *